United States Patent [19]
Cormack et al.

[11] Patent Number: 5,560,729
[45] Date of Patent: Oct. 1, 1996

[54] ELASTOMERIC JOINT FOR A BLADE TENSIONING MECHANISM

[75] Inventors: Alexander D. Cormack, Marietta; Bengt A. Nilsson, Atlanta, both of Ga.

[73] Assignee: BMH Wood Technology, Inc., Doraville, Ga.

[21] Appl. No.: 332,270

[22] Filed: Oct. 31, 1994

Related U.S. Application Data

[63] Continuation-in-part of Ser. No. 181,388, Jan. 13, 1994, Pat. No. 5,398,819.

[51] Int. Cl.⁶ ..................................... F16B 7/00
[52] U.S. Cl. ......................... 403/226; 403/225; 403/338
[58] Field of Search ................................... 403/225, 226, 403/338, 385; 209/394, 395, 674; 241/283

[56] References Cited

U.S. PATENT DOCUMENTS

| | | | |
|---|---|---|---|
| 2,010,256 | 8/1935 | Cole | 209/395 |
| 3,123,558 | 3/1964 | Sullivan | 209/393 |
| 3,744,577 | 7/1973 | Williams | 403/338 X |
| 4,032,245 | 6/1977 | Woodruff | 403/385 |
| 4,082,324 | 4/1978 | Obrecht | 403/338 X |
| 4,696,738 | 9/1987 | Risley | 209/674 |
| 4,880,204 | 11/1989 | Steele | 403/338 X |
| 5,117,983 | 6/1992 | Marrs | 209/674 |
| 5,135,329 | 8/1992 | Yuda | 403/226 |
| 5,284,251 | 2/1994 | Marrs et al. | 209/396 |
| 5,398,819 | 3/1995 | Cormack et al. | 209/674 |

FOREIGN PATENT DOCUMENTS

| | | |
|---|---|---|
| 653630 | 5/1963 | Italy . |
| 242912 | 1/1964 | Netherlands . |

OTHER PUBLICATIONS

Strakes et al., "New Chip Thickness Screening System Boosts Efficiency, Extends Wear Life," *Pulp & Paper*, 6 unnumbered pages, Jul. 1992.

Technical Data SH Bushing, undated (1 page).

*Primary Examiner*—John M. Husar
*Attorney, Agent, or Firm*—Needle & Rosenberg, P.C.

[57] ABSTRACT

A tensioning member for a blade screen that permits simultaneous tensioning of a plurality of blades in a blade screen, such as for wood chip sorting. The blades may be provided with a sawtooth detail on a bottom edge to reduce the build-up of wood ribbons or fines that would otherwise occur. An elastomeric joint is also provided which allows a dual-frame blade screen to be assembled, while compensating for any phase angle error between eccentric shafts provided to agitate the wood chips by moving the screens.

4 Claims, 11 Drawing Sheets

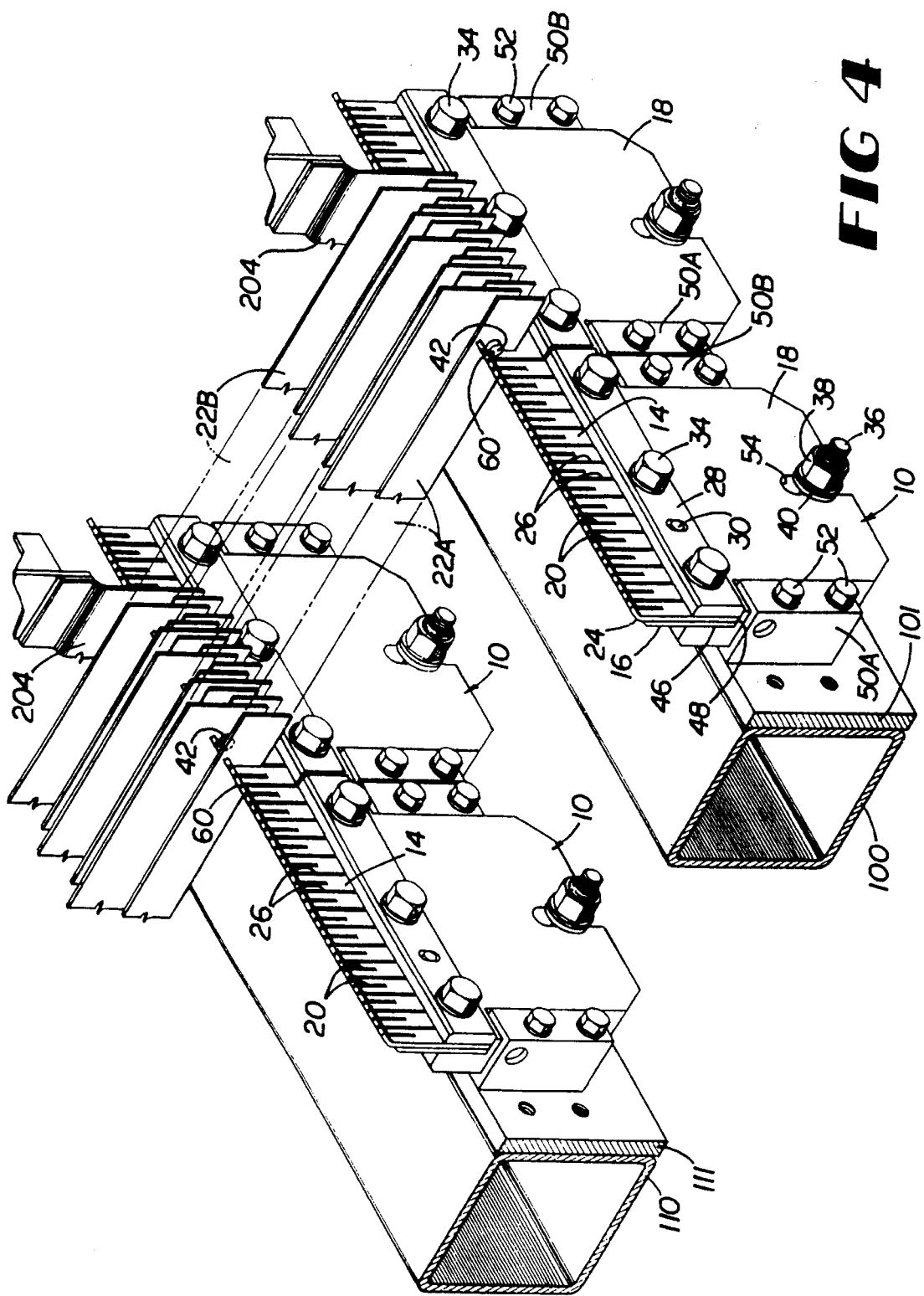

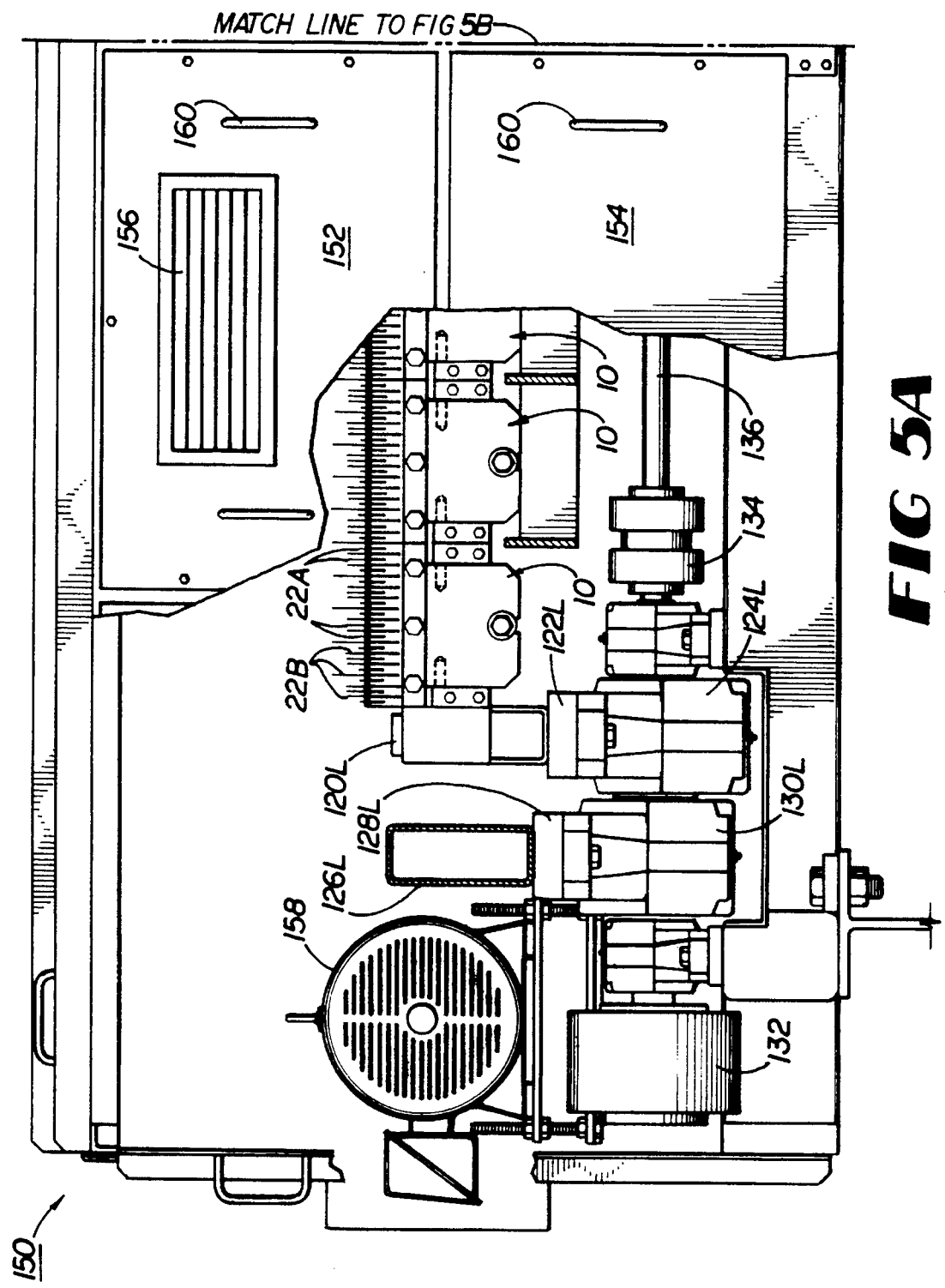

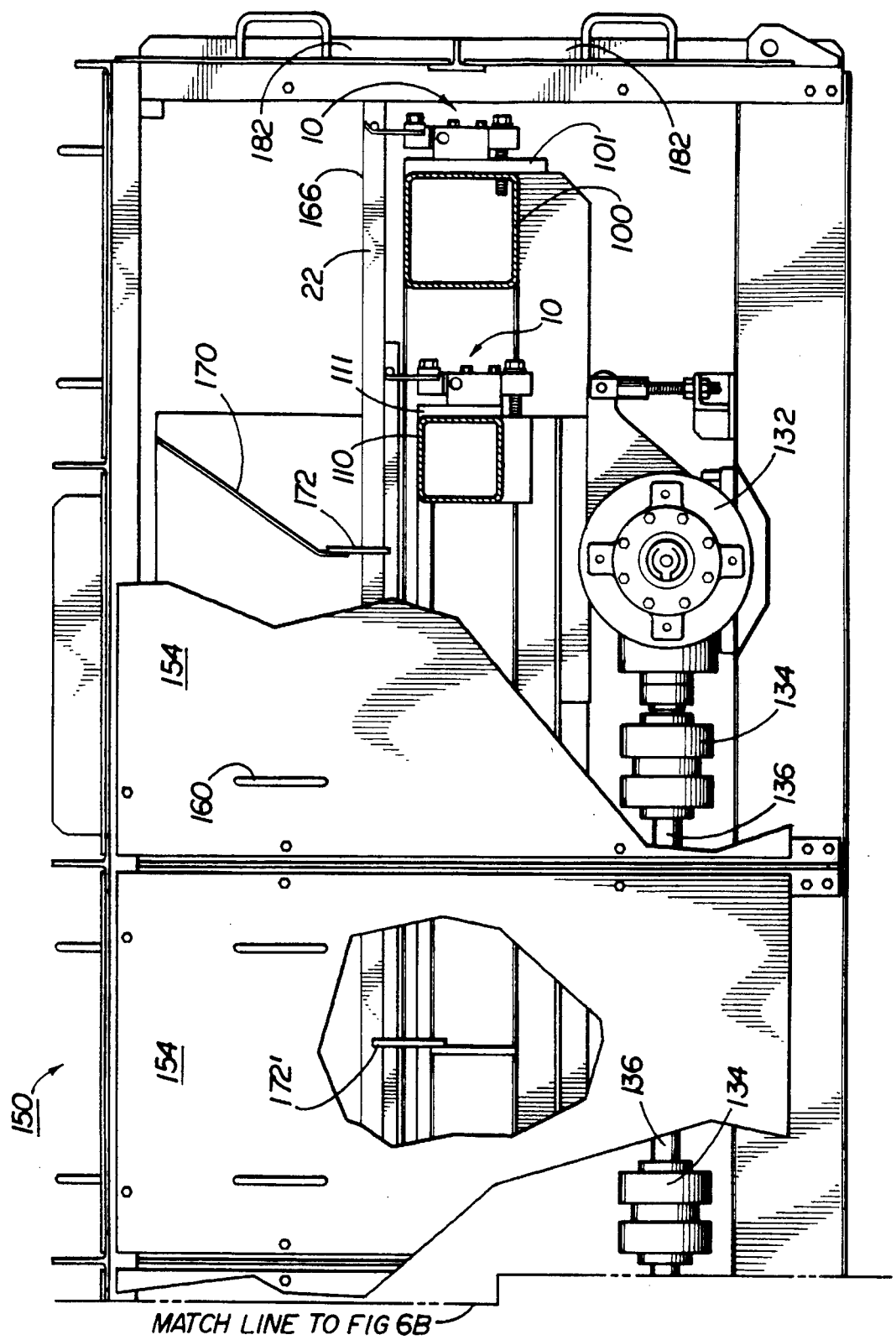

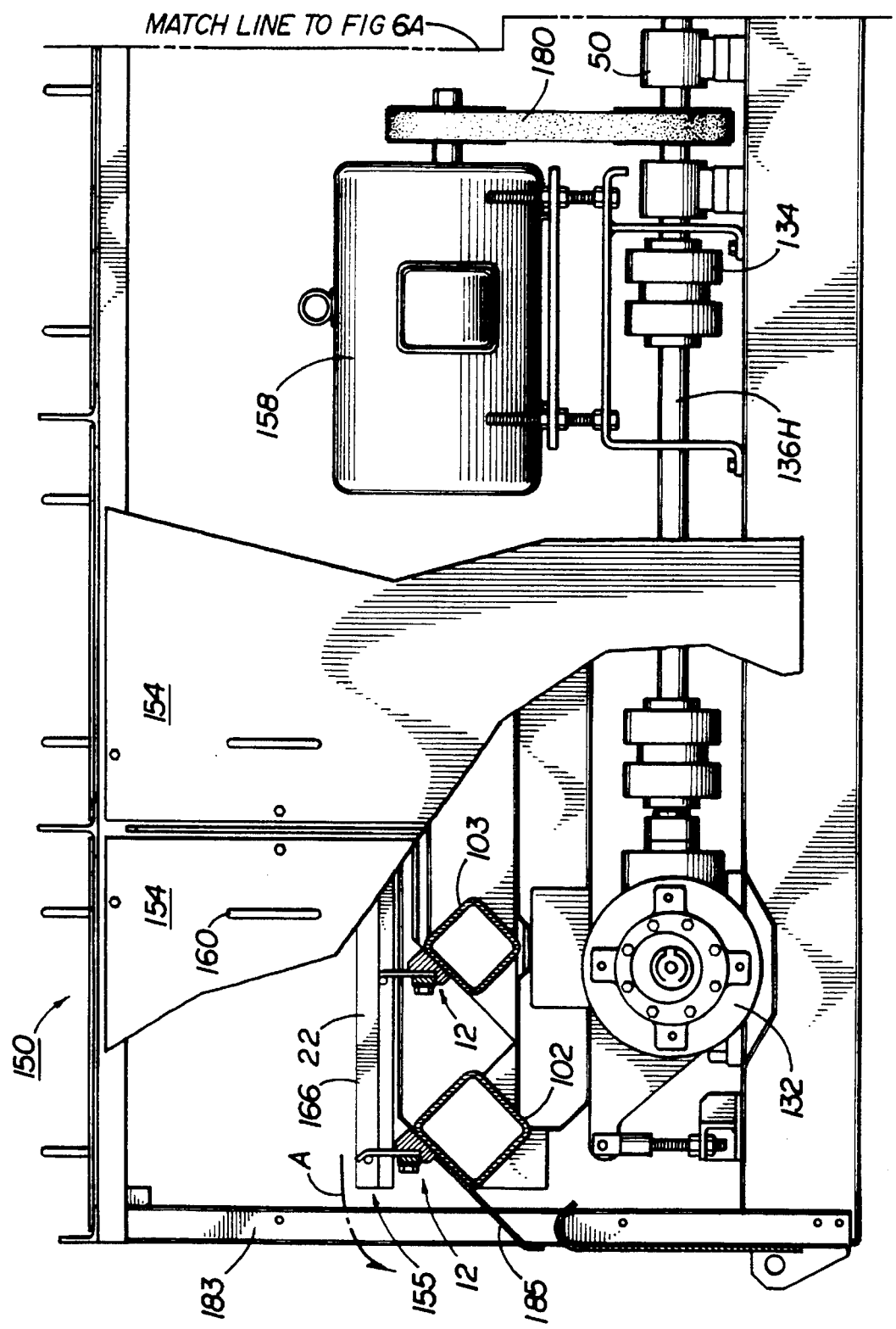

ELASTOMERIC JOINT FOR A BLADE TENSIONING MECHANISM

CROSS-REFERENCE TO RELATED APPLICATION

This application is a continuation-in-part of U.S. application Ser. No. 08/181,388 filed Jan. 13, 1994 now U.S. Pat. No. 5,398,819.

FIELD OF THE INVENTION

This invention relates to an elastomeric joint, and more particularly, to an elastomeric joint used for tensioning blades in screen suitable for use in sorting wood chips by size, as is done in making pulp for paper production.

DESCRIPTION OF THE PRIOR ART

Wood fiber is the basic ingredient used in paper production. Although other types of fibers may also be used, more than half the fiber that is used in paper manufacture comes from trees that are cut specifically for the production of pulp. These trees are cut into logs that are reduced to pulp either by being mechanically ground into pulp or by being chipped and cooked in a chemical solution. The use of chemically digested wood chips generally results in a higher quality paper than does the use of mechanically ground pulp.

Two common processes are used to chemically reduce wood chips into pulp. The sulfite process, and the sulfate, or kraft, process. In both of these processes, lignin is dissolved under heat and pressure in a digester, resulting in the separation of cellulose fibers. Processing time may be as long as 12 hours, depending upon the size of the chips and the quality of the product desired. Processing chemicals, particles of undigested wood, and foreign materials are then removed, and the pulp is further processed into paper.

The amount of processing time required depends upon the thickness of the wood chips used. Thicker wood chips require a greater time for the processing chemicals to penetrate and dissolve their lignin, and thus would require a longer processing time to completely digest. Otherwise, the undigested part of the thicker chips would have to be mechanically treated, resulting in an inferior product, or removed from the pulp. Therefore, to ensure uniform processing time and paper quality, wood chips are sized before they are processed, with thicker wood chips being removed prior to pulping.

To sort wood chips, chips are dumped onto a screen having openings through which essentially only chips smaller than a preselected thickness may pass. The chips are then agitated, causing essentially all of the thinner chips to pass through the screen. The thicker chips may be sliced to the correct thickness or used in other ways or for other purposes, or discarded.

Several types of prior art screens are known. In one of these, shown in FIG. 1(a), pairs of spiral rolls 300 are used to separate wood chips of various sizes. In operation, wood chips are dumped onto the rotating spiral rolls, the rolls rotating in the directions indicated by arrows A and B. Chips are brought into the open area 302 between the rolls by this rotation, and chips thin enough to fall into the gap are collected for processing under the screen. Meanwhile, because of the spiral motion of the threads, thicker chips are brought forward as indicated by arrow C. Eventually, they reach the end of the gears, and at that point, may be collected or discarded. Typical dimensions of the rolls 300 are such that the open area between the rolls is only 7.9% of the total cross-sectional surface area, resulting in relatively low capacity.

A second type of prior art screen is shown in FIG. 1(b). This screen comprises an array of hubs 304 and disks 306 on parallel, spaced-apart shafts (not shown). Because of the rotation of the shafts in directions indicated by arrows D and E, wood chips are brought into the region of intermeshed disks 307, where thinner chips fall through and are collected. Thicker chips remain on the screen, and must eventually be removed. The net open area for a typically dimensioned screen of this type is 20.9%. Therefore, this screen typically has greater capacity than that shown in FIG. 1(a), but still leaves substantial room for improvement.

A third type of screen is shown in FIG. 1(c). This screen is similar in operation to that shown in FIG. 1(b), except that the intermeshed hubs 304a and disks 306a vary in size along the lengths of the shafts. The typical net open area is 25.1%.

A fourth type of prior art screen is shown in FIG. 1(d). This screen comprises a series of elongate rectangular metal bars 308 arranged in parallel. An open area 310 of predetermined size separates adjacent ones of bars 308 to permit sufficiently thin wood chips to fall through for collection. The parallel, spaced-apart bars are held together by frame supports at each end. Agitation is provided by shaking the entire frame assembly. This type of screen typically provides the greatest percentage open area (37.1%–49.6%) of the prior art screens.

Because papermaking is a continuous process, the rate at which the thinner chips pass through the screen has proven in many circumstances to be a bottleneck limiting the rate at which paper can be produced in any given production line. Increasing the percentage open area would increase the capacity of the screen and therefore alleviate the effects of this bottleneck. Unfortunately, it is difficult to increase the percentage open area in prior art screens.

Referring to the screen of FIG. 1(d), the percent open area might be increased simply by using thinner bar stock. However, some wood chips, particularly wedge-shaped chips, tend to become lodged between the bars of this type of screen. It is therefore necessary to periodically stop the feeding of chips to prevent the screen from becoming clogged. This reduces the effective rate of wood chip sizing below that which would otherwise be expected from the larger effective screen open area percentages of this type of screen.

It would be possible to compensate for some of the lost capacity caused by stuck chips by further increasing the percentage of open space in the screen. Because the gap size is determined by the maximum acceptable wood chip thickness, the only way to increase the percentage of open space in the screen is to reduce the width of the bars in the screen. However, stuck chips generate pressures against the bars that tend to deform them unless the bars are of sufficiently heavy stock.

Screens comprising relatively thin, tensioned blades instead of bars are known, and such blades can comprise a screen with a substantial percentage of open space. However, one of the problems experienced with prior art tensioned blade screens is that the blades have had to be individually tensioned to provide the required stiffness required in screen separators. It was further necessary to retension the blades as each blade was progressively tightened, which resulted in frame deflection and a further retensioning. It would therefore be desirable to provide a screen tensioning mechanism that can simultaneously tension a large number of blades at a time.

Prior art blade screens also have a tenancy to generate a build-up of wood ribbons or fines between the slots and particularly around the frames supporting the blades. These ribbons or fines can interfere with the efficient operation of the screen. It is thus desirable to provide a means to prevent the build-up of such waste material.

Finally, in dual-frame screens, in which alternate blades are supported on different frames (one inside the other), it is necessary to provide a means for moving the frames relative to one another to impart sufficient agitation to the wood chips to ensure efficient separation. This motion can be imparted by moving the frames in a reciprocating motion relative to one another. Support near four corners has typically been provided, with agitation provided by an eccentric shaft. Without precision machining of frames, cams, and journals, binding can result. It would therefore be desirable to provide a joint for transferring motion from an eccentric shaft to a corner of a frame that can accommodate slight tolerance variations.

BRIEF DESCRIPTION OF THE INVENTION

The present invention provides a tensioning mechanism for a blade screen comprising a blade holder made from spring steel or other suitably stiff, springy material clamped in a bracket. The bracket is hinged and accurately located on the machine frame where it is both fastened and dowelled. A blade assembly is tightened with an elastic stop nut on a stud with the position of the load maintained via a set of spherical washers.

The elastic stop nut and stud also permit simple installation and removal of blades. By predetermining the torque required to achieve the desired blade tension, the blades can be quickly set to the specified tension.

A spring-type blade holder accommodates slight variations in the pin-to-pin center distance between the blades. It also accommodates minor deflections of the frames of the blade screen, which otherwise may cause the blades to require retensioning as they become loose due to deflection of the frames.

The blade holder allows typically, fifteen blades to be tensioned at the same time, although a greater or lesser number may also be accommodated. Previously, it was necessary to tension each blade individually. Further, retensioning was required as the blades were progressively tightened, which resulted in frame deflection and the requirement of further retensioning. The blade holder is provided with a series of parallel slots, which are preferably cut with a laser to ensure maximum accuracy, and to allow inner and outer blade assemblies to be interleaved.

In addition, the blades may be provided with a sawtooth detail to ensure that ribbons or wood fines are prevented from building up in the slots between the blades to the point at which they begin to interfere with the normal movement of the blades.

Blade holders can be changed without concern as their assembled accuracy can readily be assured by sufficiently accurate machining and by the use of locating dowels.

The blade assembly tensioning means comprises an elastic stop nut on a stud. The direction of the imposed load is preferably maintained by a set of spherical washers. The blades themselves are preferably provided with a sawtooth detail on the bottom surface. This surface is the most likely region in which a blade might encounter a build-up of ribbon-like material. Tests have shown that the region most subject to such a build-up is in the vicinity of the blade holders at the discharge end of the screen, with the most pronounced build-up being on the outer frame. The sawtooth detail on the blades, together with the straight spring bent towards the discharge, effectively eliminates the build-up of these ribbons.

An elastomeric joint to connect a frame to an bearing housing is also provided. The elastomeric joint comprises a pair of segments attached to opposite vertical sides of a frame member, a bearing support, and an elastomeric strip. The elastomeric strip performs two functions. First, it connects the frame member and the bearing housing. Second, the elastomeric joint accommodates small tolerance variations that would otherwise bind the movement of the frames, yet maintains the relative positions of the frame and the bearing housing.

It is thus an object of the invention to provide a blade tensioning means that can effectively allow a plurality of blades to be tensioned simultaneously. It is a further object of the invention to provide a blade that reduces the accumulation of wood fines or ribbons, especially in the vicinity of the blade holder and guides. It is a still further object of the invention to provide a elastomeric joint that prevents binding in a dual eccentric shaft assembly. These and other objects will become apparent to one skilled in the art upon reading the detailed description.

BRIEF DESCRIPTION OF THE DRAWINGS

FIG. 1(a) shows a screen comprising worm gears. FIG. 1(b) shows a screen comprising an array of hubs and shafts. FIG. 1(c) shows a screen comprising a modified array of hubs and shafts. FIG. 1(d) shows a screen comprising a plurality of bars.

FIG. 4 is another perspective view of a portion of a blade screen tensioner, showing the inner and outer frames of the screen and their relationship to one another and to the blades themselves.

FIGS. 5(a) and 5(b) are cut-away front views of different sections of a blade screen separator having a blade screen tensioner in accordance with the invention.

FIGS. 6(a) and 6(b) are cut-away side views of different sections of the blade screen separator of FIGS. 1(a) and (b).

DETAILED DESCRIPTION OF THE ILLUSTRATIVE EMBODIMENTS

Figure 1A:
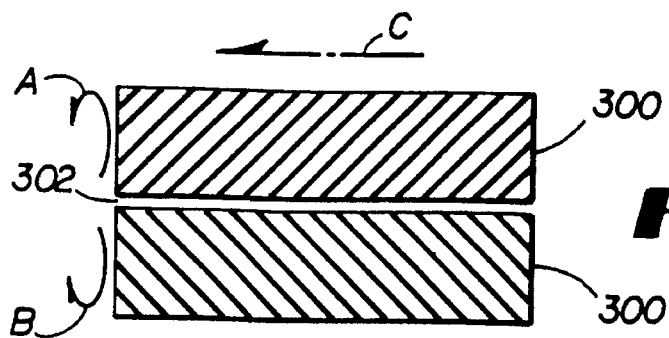
FIGS. 1(a)–(d) are schematic views of the top of various prior art screens.
Figure 1B:
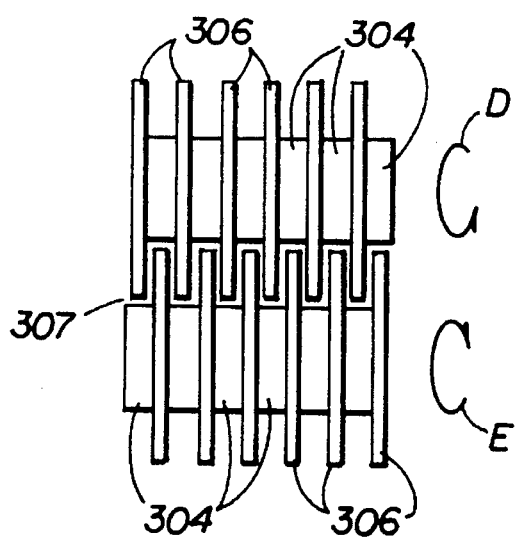
Figure 1C:
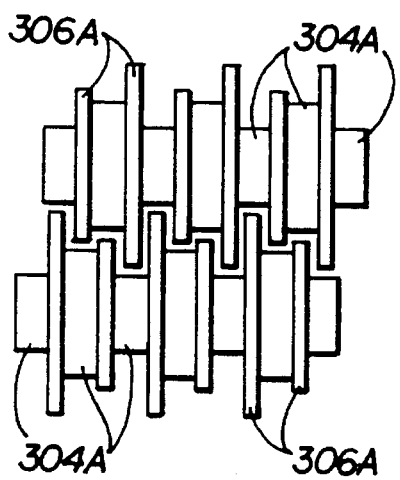
Figure 1D:
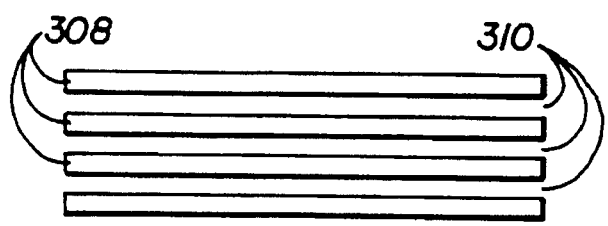
Figure 2:
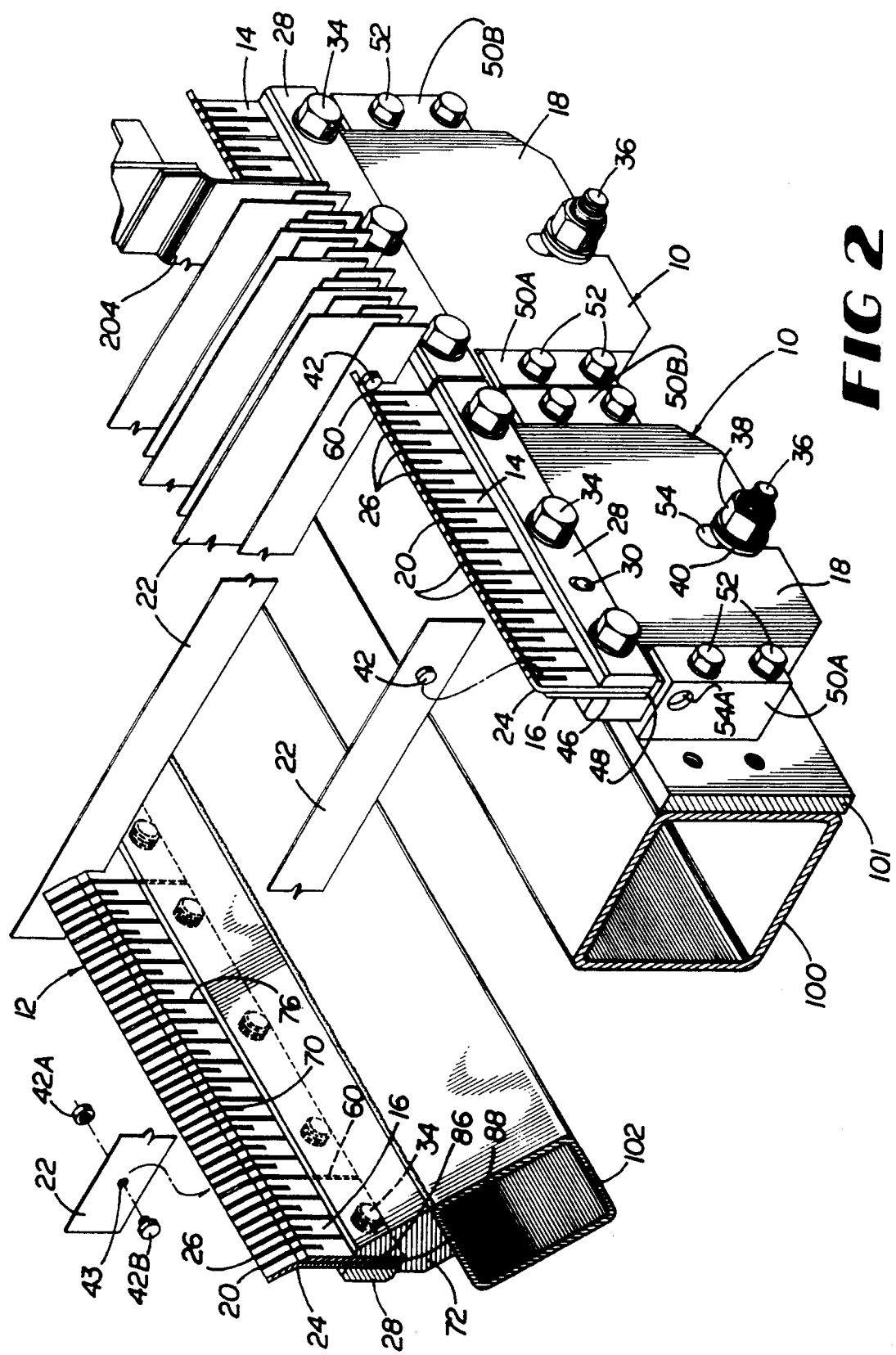
FIG. 2 is a perspective view of a portion of a blade screen tensioner, showing the relationships between the blades and one of the frames comprising the screen.

Turning now to FIG. 2, a view of an embodiment of the inventive tensioning device 10, 12 for a blade screen is shown. The front assembly 10 of the tensioning device comprises a steel spring blade holder 14, a reinforcing comb 16, and a bracket 18. (It is to be understood that other suitably stiff and springy materials may be substituted for steel in blade holder 14.) Blade holder 14 and reinforcing comb 16 are fixedly attached to bracket 18 by any suitable means. In the illustrated embodiment, a clamp 28 presses both blade holder 14 and reinforcing comb 16 against a recessed face 46 of bracket 18. The flat, straight bottom edges of blade holder 14 and reinforcing comb 16 may be fixed against a bottom wall 48 of the recessed region. Bolts 34 are threaded into clamp 28, blade holder 14, reinforcing comb 16, and recessed face 46 to hold blade holder 14 and reinforcing comb 16 in place. An alignment pin 30 may be provided to align the blade holder 14 and reinforcing comb 16.

Blade holder 14 is provided with a series of spaced-apart vertical slots 20 alternating with longer, spaced-apart vertical slots 26. For accuracy, these slots are preferably cut by lasers. Preferably, neither slots 20 nor slots 26 extend into the clamped region between recessed face 46 and clamp 28. This permits each section of blade holder 14 and reinforcing comb 16 to be handled and secured as a unit, even though both may tension a plurality of blades 22. Slots 26 preferably do, however, extend essentially up to the clamped region, thereby allowing blade holder 14 to act as a series of simultaneously positioned, but independently deformable tines around each of shorter slots 20. Slots 20 are dimensioned to allow separate blades 22 to be placed therein. Reinforcing comb 16 also has a similar series of vertical slots of alternating length (70, 76, not shown in conjunction with front portion 10, but better seen at rear portion 12 of the tensioning device), which are aligned with and are essentially same length as slots 20 and 26 in blade holder 14.

Slots 20 are dimensioned to hold blades 22 therein and to permit tensioning by the tensioning device 10 in a manner to be explained below. Vertical slots 26 are dimensioned to allow blades tensioned on different frame to pass therethrough, and to permit relative movement between the two frames. If more than one bracket 18 is provided, the brackets 18 should be positioned so that a space 60 equivalent to a slot 26 may be provided between the blade holders 14 and reinforcing combs 16 affixed to adjacent brackets 18.

Bracket 18 itself is held in place between a pair of hinge sections 50a, 50b, which may be stationarily affixed to a frame member 100 (or an optional attachment plate 101 affixed to the frame member) by any suitable means, such as by bolts 52. A dowel 54a is provided through a hole in the hinge sections 50a, 50b, to allow bracket 18 to pivot about the dowel's axis. Bracket 18 has a slot 54 to accommodate a stud 36 affixed to front frame member 100 (or attachment plate 101). An elastic stop nut 38 on stud 36, is provided to hold bracket 18 in place against the tension of a plurality of blades 22, preferably in conjunction with spherical washers 40.

Rear frame member 102 (which is the rear of the frame comprising front frame member 100) has a separate, fixed rear tensioning assembly 12. Rear tensioning assembly 12 comprises a fixed rear mounting bracket 72 affixed to rear frame member 102 by a suitable means, such as by welding. Rear mounting bracket 72 preferably has surfaces 86, 88, corresponding to recessed face 46 and wall 48, respectively, of front bracket 10 for mounting blade holders 14 and reinforcing combs 16 thereto, using brackets 28 and bolts 34. Of course, any other suitable mounting means may be employed for mounting the blade holders 14 and reinforcing combs 16, provided that the blade holders 14 and reinforcing combs 16 on the front assembly 10 and rear assembly 12 are suitably aligned, so that each blade 22 may be inserted into corresponding short slots 20, and interleaved blades affixed to another screen (not shown) may engage slots 26. The blade holders 14 and reinforcing combs 16 of the rear assembly 12 may be identical to those in front assembly 10; if a plurality of holders 14 and combs 16 are used, they should be separated so as to form a slot 60 equivalent to longer slots 26 and 76.

Blades 22 are provided with (preferably elastic) press-fit snaps 42 or other suitable engagement means to engage blade holders 14 in both the front and rear assemblies 10, 12. A press-fit snap comprising two sections 42a, 42b is shown at the rear of blade 22 in FIG. 2. The snap 42 fits through a hole 43 in the blade. Hole 43 is positioned so that the blade 22 may rest at the bottom of a short slot 20, while the snap 42 engages blade holder 14 in a short slot 20 at bend 24. Bend 24 is preferably at an approximately 45 degree angle to prevent the snap 42 from riding up the slot 20 or deforming the blade holder 14 around slot 20. The bends 24 of the front and rear tensioning assemblies 10, 12 are directed in opposite directions, away from one another, so that, motions tending to cause a blade 22 to migrate upward cause the spring blade holder 14 to redirect the blade downward into its respective slot 20.

Figure 3:
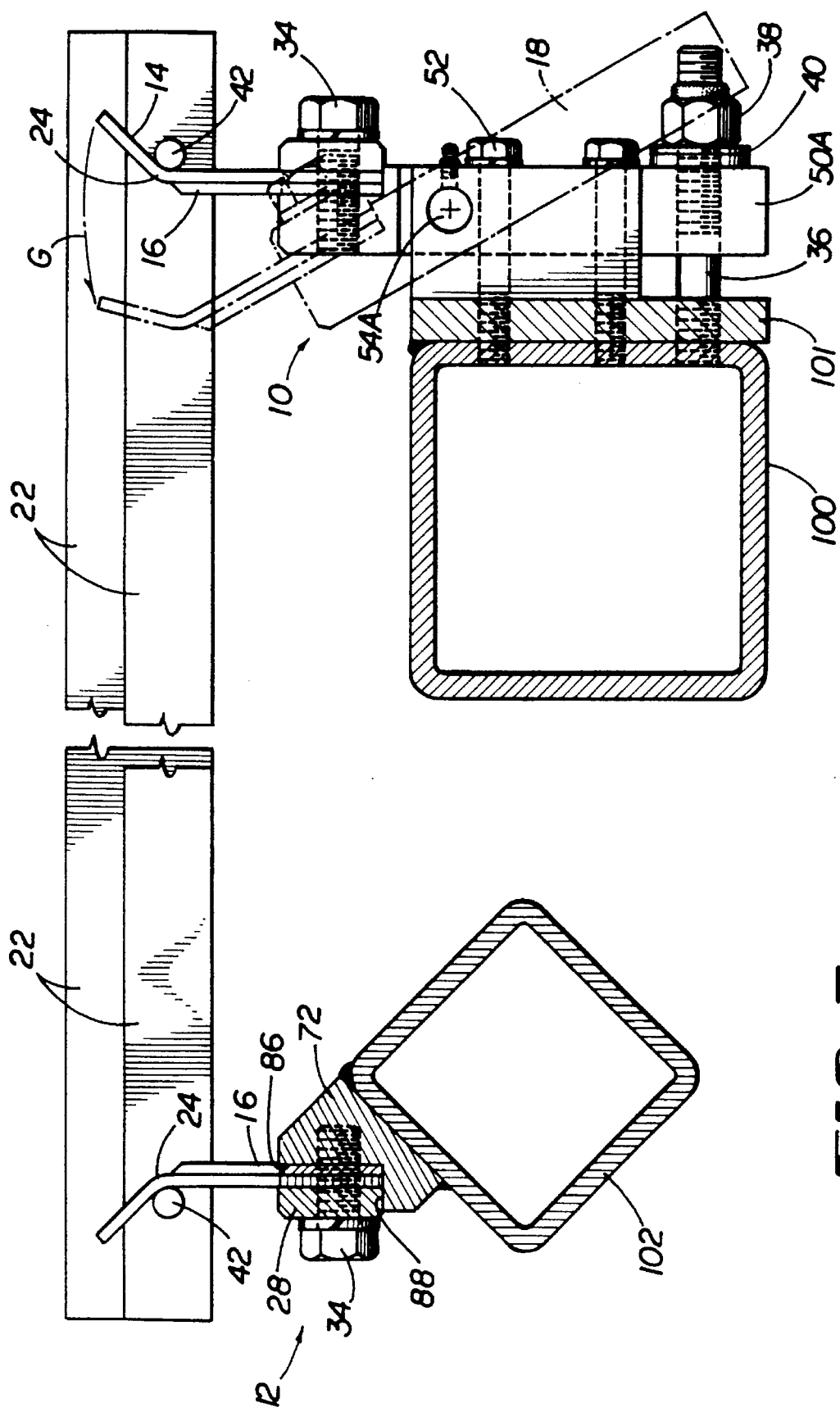
FIG. 3 is a side view of a portion of a blade screen tensioner in accordance with the invention, showing the operation of the tensioning mechanism.

Turning now to FIG. 3, a side view of the tensioning device is illustrated. Because slots 20 are aligned between the front and the rear tensioning assemblies 10, 12, blades 22 (which show blades of alternating height) may be inserted into position by pivoting bracket 18 into its open position as indicated by the phantom lines and arrow G. Bracket 18 is then returned to its closed position, and elastic stop nut 38 is tightened on bolt 36. This tightening causes the spring blade holders 14 on front and rear tensioning assemblies 10, 12 to pull on snaps 42, tensioning blades 22. Stop nut 38 may be tightened until the desired tension is obtained.

Spring blade holder 14 is able to accommodate slight tolerance variations on each of blades 22 tensioned within slots 20, partly because of the relatively independent spring action around each slot 20 (Each slot 20 is surrounded by either an edge of the blade holder 14 or a long slot 26 on each side. Thus, each slot 20 behaves as though it were formed in an independent spring.), and partly because of the elasticity of the snaps 42. In addition, the slightly curved inner surface of blade holder 14 at bend 24 allows the snap to position itself appropriately against the blade holder, automatically compensating for slight tolerance variations. It has been found highly advantageous to provide reinforcing comb 16 to provide stiffness to the straight section of blade holder 14 below bend 24, while allowing blade holder to provide greater spring action bend 24. Reinforcing comb 16 thus has height only sufficient to reach approximately to bend 24, and is preferably beveled at its top. Thus, reinforcing comb 16 transmits a substantial fraction of the tension provided by tensioning assemblies 10 and 12 to blades 22, while the spring action of blade holder 14 above bend 24 is largely responsible (together with the elasticity of snaps 42) for accommodating variations in tolerances, such as those between blades (including, for example, the heights of holes 43, the dimensions of snaps 42, the distance between holes 43 on a blade), or other tolerance variations having a similar effect.

Referring to FIG. 4, fixed fences 204 (only one of which is shown) are also provided at each side of the screen to prevent wood chips from exiting the sides of the screen comprising a plurality of blades 22, rather than going through it. Fixed fences 204, which extend the entire length of the screen, and which may be supported by attachment to a portion of the separator structure (not shown) each engage slots 20, 26 in a manner analogous to a blade 22, although they need not be secured to the blade holders 14, since they are secured to the separator structure.

FIG. 4 shows a view of the front members 100, 110 of an outer and an inner frame, respectively. Front frame members 100, 110 are shown with optional attachment plates 101, 111, respectively, affixed thereto. Alternating blades 22A, 22B have snaps 42 disposed at different positions along their length, so blades 22A may be held in place by tensioning assemblies 10 on the inside front frame member 110, and blades 22B may be held in place on the outside front frame member 100. (The snaps 42 at the rear are similarly disposed differently between alternating blades, so that a blade held in place by a front tensioning assembly 10 on either an inner or outer frame is held in place by a rear tensioning assembly 12 disposed on a rear member of the same frame—either the inner frame or the outer frame. It is, of course, to be understood that blades 22A and 22B shown in FIG. 4 are each representative of one-half of a set of interleaved blades forming a screen.) Each of blades 22A and 22B are, however, at least long enough so that all of the blades extend across the entire length of the outer frame assembly. The slots 20, 26 in front tensioning assemblies 10 are aligned so that a blade 22A engaged in a short slot 20 in a tensioning assembly 10 on inner front frame member 110 passes through a long slot 26 (or an equivalent slot 60 between two tensioning assemblies) in a tensioning assembly 10 on outer front frame member 100. Similarly, a blade 22B engaged in a short slot 20 in a tensioning assembly 10 on outer front frame member 100 passes through a long slot 26 (or an equivalent slot 60 between two tensioning assemblies) in a tensioning assembly 10 on inner front frame member 110. Because the flat faces of each blade 22A, 22B are in a vertical plane, and because long slots 26 are vertically disposed, the inner and outer frames may move slightly relative to one another in directions X, Y, parallel with the flat faces of interleaved blades 22A and 22B, to agitate wood chips placed on a screen comprising the interleaved blades.

Each front and rear tensioning assembly 10, 12 provides space for fifteen blades 22. Although fifteen blades is considered a practical number to tension together, the tensioning assemblies 10, 12 may easily be modified to tension a greater or lesser number of blades. Although a tensioning assembly for a greater number of blades may reduce the amount of work required to tension an entire screen, tensioning too many blades at once may prove impractical. The amount of torque needed to adequately tighten nut 38 (which may vary with the size and composition of blades 22 in the screen) must be taken into consideration. If the torque required is excessive, tensioning may prove too difficult.

Figure 5B:
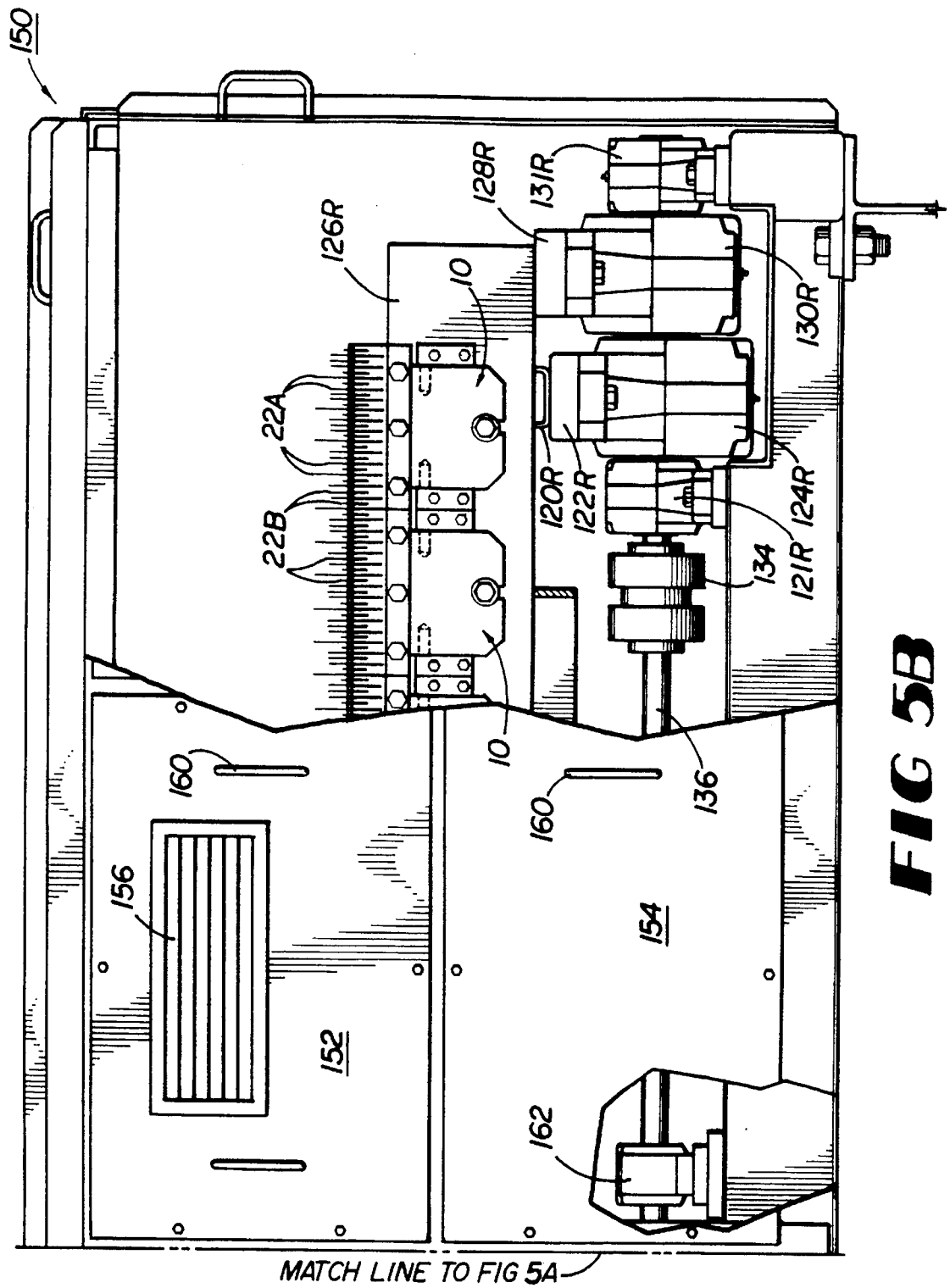

Referring now to FIGS. 5(a) and 5(b), which together form a staggered, cut-away front view, and also FIGS. 6(a) and 6(b), which together form a staggered, cut-away side view, a wood chip separator 150 incorporating the inventive blade screen assembly is shown. For clarity of illustration, and to provide a more detailed view of the invention and its relationship to the other components in the separator, the drawing of the front view of the separator has been divided into two sections, FIGS. 5(a) and 5(b), that are to be joined along the indicated match line. The side view has similarly been divided into two sections, FIGS. 6(a) and 6(b), which are also to joined along an indicated match line. The wood chip separator 150 is enclosed on all sides by a combination of vented panels 152 and unvented panels 154. Vents 156 provide air circulation for the electric motor 158 inside. The vented and unvented panels 152, 154 may be removed with the aid of handles 160 to access the internal parts of separator 8.

FIG. 5(a) shows a embodiments of the front assembly 10 of the tensioning device on an inner frame member (not visible in FIG. 5(a)). Interleaved blades 22A and 22B, previously described in conjunction with FIG. 4, are shown in relationship to one another in this end-on view. Journal 162 for shaft 136 is also shown in FIG. 5B. Right side components are identified by an "R" suffix for the reference numerals, corresponding to the "L" suffix for the left. Side member 120L of the inner frame is mechanically coupled to an eccentric journal 122L, which is part of a conventional crankshaft and bearing assembly 124L. Side member 126L of the outer frame is mechanically coupled to another eccentric journal 128L, which is part of another conventional crankshaft and bearing assembly 130L. Crankshaft and bearing assemblies 124L, 130L are coupled to a shaft 136, which may actually comprise a number of sections joined by one or more flex couplings 134L. The shafts are rotated by electric motor 158, through additional shafts 136L and couplings 134L, and right angle reducer 132. A similar arrangement on the right side of the frame is shown in FIG. 5B, where the cut-away section is arranged to show the tensioning assemblies 10 disposed on the outer frame. The eccentric journals 122L, 128L, 122R, and 128R, together with other similar assemblies at the rear of the inner and outer frames, impart a coordinated, complementary reciprocating motion to the inner and outer frames in a plane parallel to the flat surfaces of blades 22A and 22B when motor 158 is energized. This motion agitates wood chips placed on top of the screen formed by the various blades 22A, 22B.

Electric motor 158, better shown in FIG. 6(b), is coupled by belt 180 to a high speed shaft 136H. Flex couplings 134 are provided in high speed shaft 136H to simplify servicing of shaft 24. Conventional right angle reducers 132 couple the motion of shaft 136H to the low speed shafts 136 in the front and rear of chip sorter 150. The low speed shaft 136 in the front of the chip sorter 150 is shown in FIGS. 5(a) and 5(b), and is coupled to the eccentric journals 122L, 122R, 128L, 128R. Additional coordinated eccentric cranks (not shown) are provided in corresponding positions at the rear of chip sorter 150 for the same purpose. Power is supplied to the cranks at the rear of chip sorter 150 by means of a shaft (not shown) at the rear of the sorter coupled to a right angle reducer 132.

In operation, wood chips are fed from a wood chipper (not shown) into chip sorter 150 from the top at a point some distance inward from the front panels. A chute or baffle 170 is preferably provided for this purpose and to prevent wood chips from impinging on the front panels 182 or from falling off the edge of the screen near the front panels 182. The end of baffle 170 is provided with a spacer comb 172, the sides of which are mounted to inner frame members; thus, baffle 170 moves relative to the outer frame. The spacer comb 172 permits the blades 22 (one of which is shown lengthwise in FIG. 6(a)) to reciprocate within its slots, while preventing stray chips from working their way towards the front of the chip sorter near front panels 182. An additional spacer comb 172' can be provided near the center of the screen. The reciprocating motion of one set of blades 22A relative to the other set 22B encourages smaller wood chips to fall between the blades into a collector (not shown). Larger wood chips do not fall through and are essentially shaken out towards the rear 183 of separator 150, where an outflow of "overs" occurs as indicated by arrow A. A baffle 185 is preferably provided to guide this flow out of the open rear end of the sorter. The overs may be reprocessed into smaller chips, discarded, or used for other purposes. Spacer comb 172' assists in preventing blades 22 (comprising blades 22A and 22B) from being bent out of shape, thereby distorting the blade gap, should chips having odd shapes and sizes (particularly wedge-shaped chips) become caught between blades 22. Thus, clogging or ruining of the screen is effectively prevented and the quality and efficiency of chip thickness is assured. The portions of the inner frame 103 and outer frame 102 nearest the rear 183 of the chip sorter 150 preferably do not present horizontal surfaces at their top. Such a horizontal surface might tend to accumulate chips on its top and thereby impede the outflow of overs, thus slowing the sorting process.

As noted above, blades 22 are preferably made of sawblade material. To ensure that the proper tension can be provided on the blades 22, and also to ensure that they do not deform too easily if odd-shaped (particularly wedge-shaped) wood chips become stuck between them, the minimum thickness of the sawblade material should be 1.5 millimeters. The blades should also be thin enough to permit them to be tensioned, as shown below, without excessive torque being required. Otherwise, the maximum thickness is readily determined by the percentage of open space desired in the screen and the desired spacing between adjacent ones of the blades 22 (i.e., blades 22A and blades 22B), the spacing, of course, being determined by the wood chip size requirement.

Figure 7:
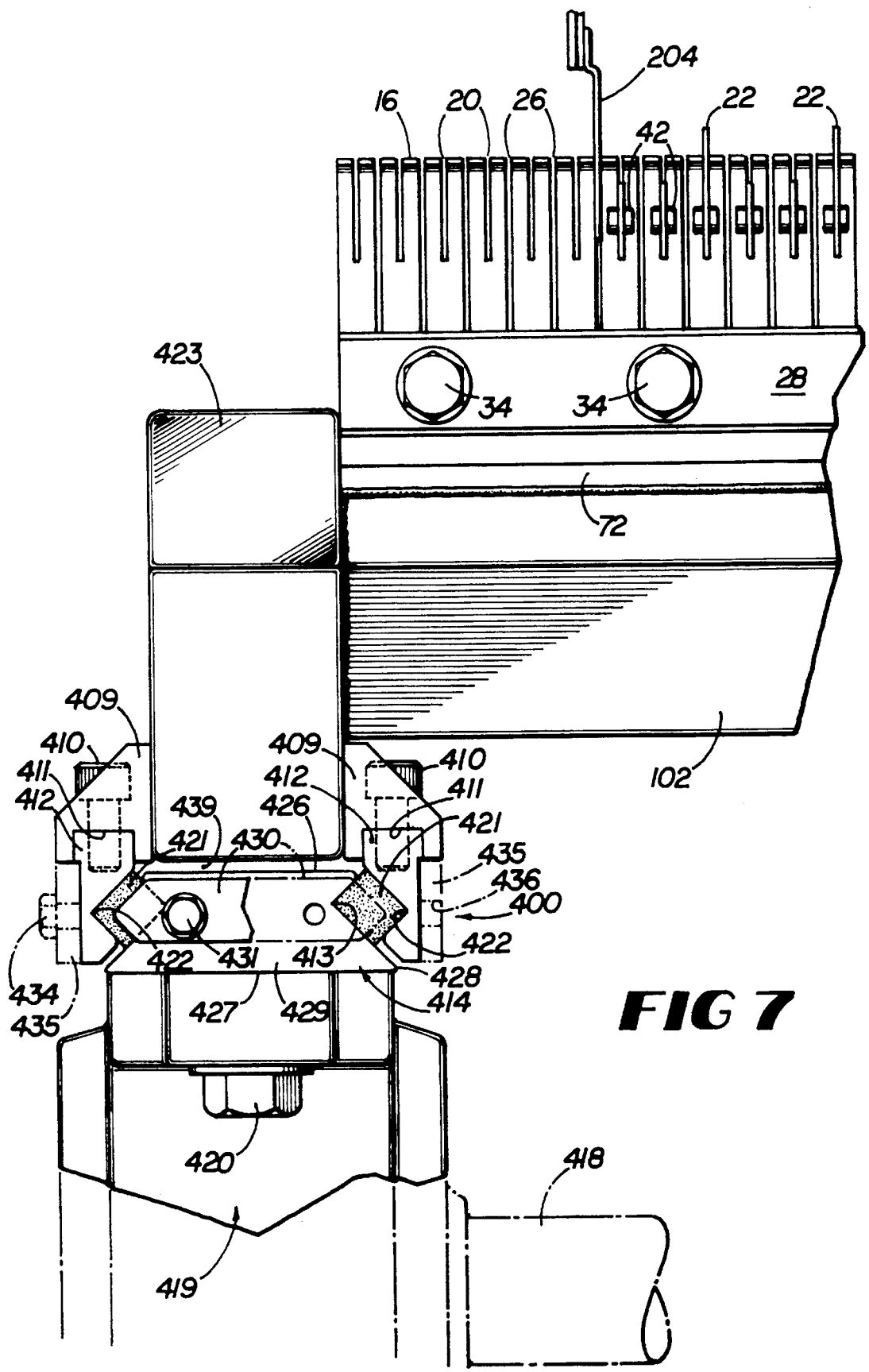
FIG. 7 is a partial end view of the mounting of one of the cross beams of the frame on a longitudinal beam, showing the elastomeric joint of the present invention.
Figure 8:
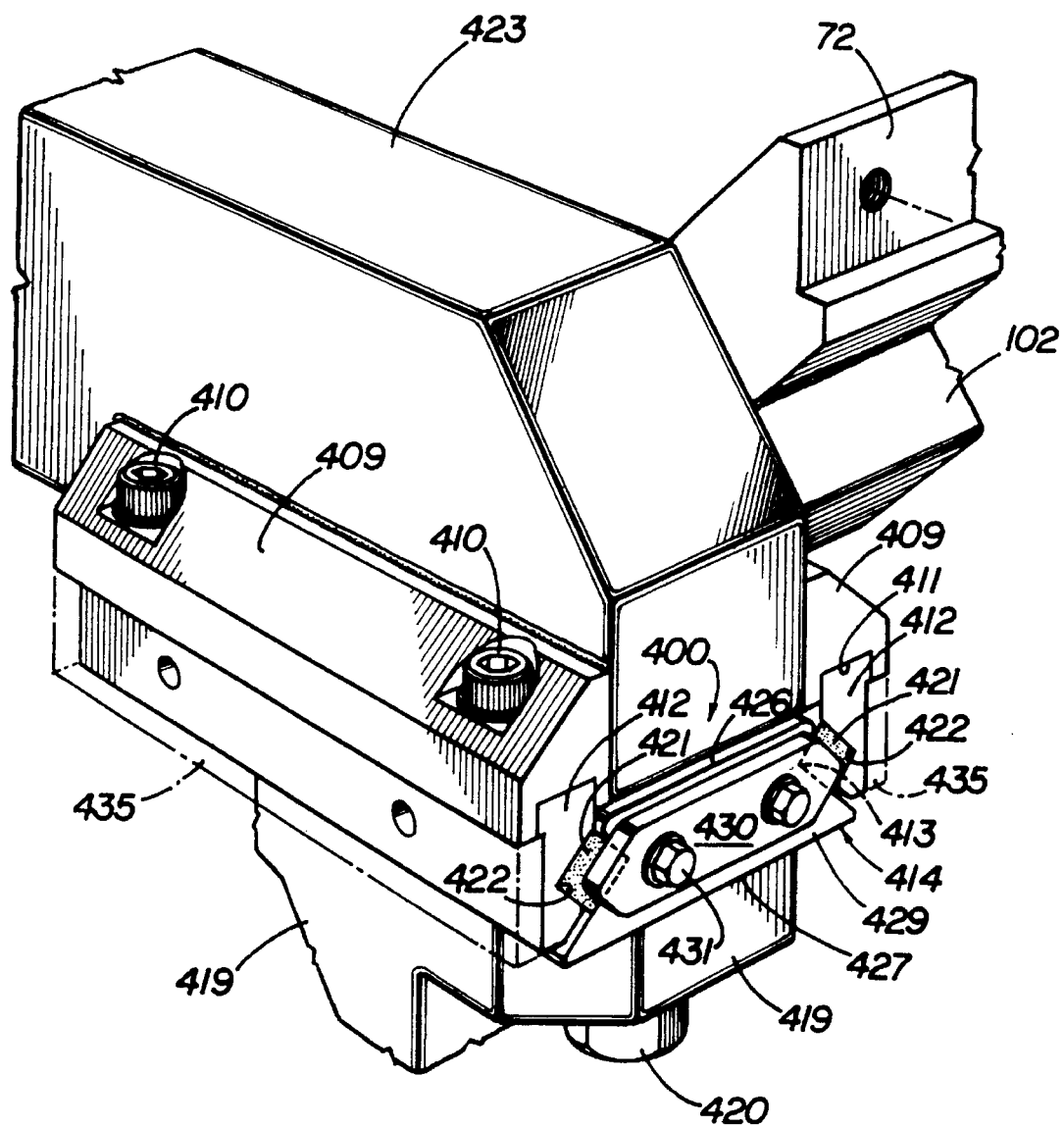
FIG. 8 is a perspective view of the mounting shown in FIG. 7.

FIGS. 7 and 8 show how the eccentric shafts 418 adjacent the ends of the rear frame members 102 and 103 are coupled to their respective frames 100 and 110. To allow the inner frames 103 and 110 and outer frames 100 and 102 to move properly, additional eccentric shafts, such as shaft 418 shown in FIG. 7, are required at the rear of the frames 102 and 103. The movement of these additional eccentric shafts must be properly coordinated with the movement of eccentric shafts (not shown) at the front of the frames 100 and 110 to account for such things as discrepancies in the length of the frames and small differences in phase angle from one eccentric shaft to the other. Without the elastomeric joint 400 of the present invention, the moving mechanism could bind, wear, or destroy itself. Each eccentric shaft, such as shaft 418, is provided with an elastomeric joint 400 to reduce the criticality of the frame dimensions and to absorb small movements in the order of 0.005 to 0.010 inches.

The elastomeric joint 400 comprises a pair of wing members 409 fixedly and stationarily attached onto each vertical face of the respective frame member (e.g., side frame or longitudinal member 423), preferably by welding to rear frame member 102. The underside of each wing member 409 includes a longitudinal channel 411 which receives therein the top of segment 412. Suitable attachment means, such as bolts 410, secure each of the wing members 409 to the segments 412. Aligned notches 422 longitudinally extend along the inwardly directed, opposed faces of the segments 412.

Each eccentric shaft 418 has a bearing housing 419 fixedly attached thereto. The bearing housing 419 is drilled to receive a bolt 420. On the top surface of the bearing housing 419 is a bearing support 414 which has a top 426, a bottom 427 affixed to the bearing housing 419, two opposed ends 429, and two opposed sides 428. The bearing housing 419 and bearing support 414 are joined by a suitable attachment means, such as a bolt 420. The preferred material of the bearing support 414 is low carbon steel. The bearing support 414 has indentations 413 on the two sides 428, as shown in FIGS. 7 and 8, which face, and are in registry with, the notches 422.

A pair of elongated elastomeric strips 421 each fit into the space formed by the indentation 413 on the bearing support 414 and the notch 422 of the segment 412. The elastomeric strips 421 thus serve as a connection between the bearing housing 419 and its respective side frame member 423 and also absorb any relative motion between the bearing housing 419 and its respective side frame member 423.

The preferred embodiment of the elastomeric strip 421 is constructed of a hard rubber. Specifically, the inner core (diameter($\phi$) 0.75) material comprises ASTM D 2000 M5 AA714, natural rubber 75±5 Shore A. The outer rubber (1.07"×1.30") comprises ASTM D 200 M4 AA617, natural rubber 60±5 Shore A. The outer elastomer and inner core elastomer are bonded during vulcanization. The recommended load deflection is as follows: pre-load deflection 0.06"–0.10"; static load maximum 1000 pounds (spring rate 16666 pounds/inch). The manufacturer is GMT International Corporation, P.O. Box 117, Villa Rica, Ga. 30180 (reference drawing #602733508). This material is strong enough to maintain the relative positions of the bearing housing 419 and the side frame 423, yet still have some flexibility to absorb relative movements in the order of 0.005 to 0.010 inches. These small variations may be caused by slight differences in phase angle from one eccentric shaft 418 to another or discrepancies in the length of the frames 100, 102, 103, and 110.

To further assist in allowing slight movement to tolerate variations during operation, a minute gap 439 exists between the bottom of the frame member 423 and the top 426 of the bearing support 414.

The elastomeric joint 400 can also comprise an end plate 430 which functions to prevent "creep," which is longitudinal movement, of the elastomeric strip 421. The end plate 430 may be attached to each end 429 of the bearing support 414 by bolts 431.

The elastomeric joint 400 can also comprise a pair of longitudinally extending clamp plates 435 which are located on the outside of the elastomeric joint 400 beneath the bottom surface of the wing members 409 adjacent the segments 412. As seen in FIG. 7, a capscrew 434 extends through the clamp plate 435, the elastomeric joint 400—specifically the segment 412, the elastomeric strip 421, the bearing support 414, the other elastomeric strip, and the other segment 412—and terminates in a tapped hole 436 in the other clamp plate 435 on the opposite side of the elastomeric joint 400. The pair of clamp plates 435 in conjunction with the capscrew 434 can compress each of the elastomeric strips 421 to facilitate the mounting of the elastomeric joint 400. There are preferably two capscrews 434 used on each elastomeric joint 400. After mounting the elastomeric joint 400, the capscrews 434 are removed, along with the clamp plates 435, to allow movement as necessary under load.

In the preferred embodiment of joint 400, the above-described elements which comprise the joint 400 are in a self-contained unit which can be bench-assembled. The advantage of this self-contained unit is that it can be assembled to achieve a desired loading of the elastomeric strips 421 prior to mounting.

The elastomeric joint 400 permits the screen 166 to function without binding. As discussed above, the arrangement compensates for relative phase angle error between eccentric shafts 418 at the corners of the frames 100, 102, 103, and 110 (including bearing housing 419). Although phase angle error can be adjusted within limits by using an SKF Industries (King of Prussia, Pa.) SH type bushing (not shown) in the couplings(not shown) on the main drive shaft 136H and cross shafts 136, it has been found essential to incorporate an elastomeric joint 400 in practical screens.

The recommended procedure to adjust the eccentric shaft assemblies (such as that comprising inboard bearing 121R, outboard bearing 131R, and eccentric bearings 124R and 130R in FIG. 5B) in order to correct the phase angle error is to set each eccentric shaft (not shown) so that the eccentrics (also not shown) are at top dead center (outer frame 100 and 102) and bottom dead center (inner frame 103 and 110), respectively. This can be done by setting a line (not shown) scribed on the shaft 136, to a prick point (not shown) on the pillow block housing (not shown). The prick point mark is located at 12 o'clock on the housing. In the event some of the eccentric shafts are now at 11 or 1 o'clock, they may be brought to 12 o'clock by loosening the SH bushing located in the disk type couplings 134 and rotating their respective shafts 136. With the bushing (not shown) loose, this can be done without affecting the other eccentric shafts which have correct alignment.

Figure 9A:
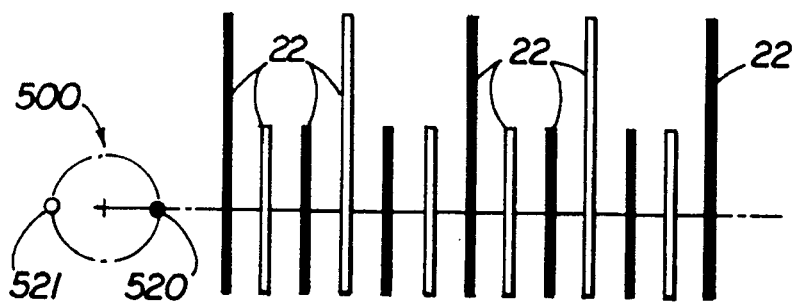
FIGS. 9(A), (B), and (C) are end-view schematic representations of the reciprocating motion of blades in a blade screen.
Figure 9B:
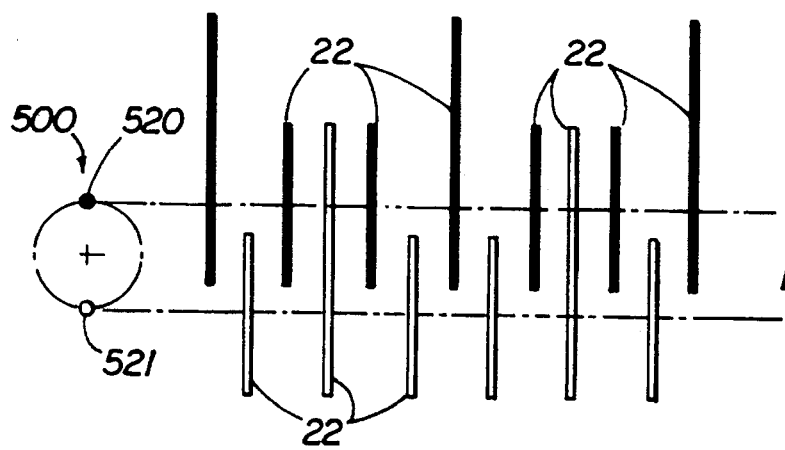
Figure 9C:
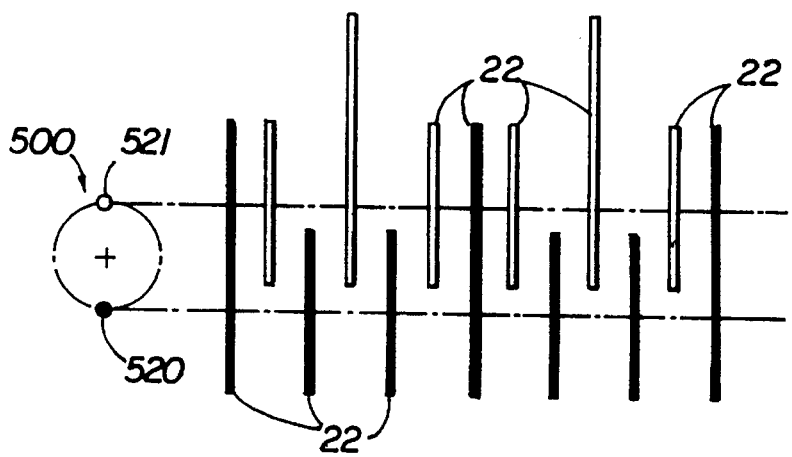

Turning now to FIGS. 9(A), (B), and (C), we observe an end view of the pattern of sets of adjacent blades 22 in the screen. FIGS. 9(A)–(C) show blades 22 mounted on one of the frames, e.g., an inner frame, as thin, unfilled rectangles, while the blades 22 mounted on the other frame, e.g., an outer frame, are shown as solid bars. It will be recognized that which frame is identified as the inner frame and which is identified as outer frame is not important for purposes of this illustration. In a preferred embodiment, two different heights of blades are used. Graph 500 shows the relationship of the frames, as shown by corresponding solid dot 520 and empty dot 521. In FIG. 9(A), the reciprocating motion of eccentric shafts coupled to the frames brings the frames into horizontal alignment, as indicated by graph 500, so that the frames are at equal vertical height. The reciprocating motion of the eccentric shafts is circular and the frames are preferably 180 degrees out of phase, as shown in graph 500. However, horizontal relationships are not shown in the end view of FIGS. 9(A), (B), or (C).

The blades in FIG. 9(A) are arranged in a pattern to further enhance the tilting action of the wood chips passing over and through the sorter. On each frame, there is a repeating pattern of alternating larger blades and smaller blades 22. Preferably, the blades on each frame are arranged so that two smaller blades are between each pair of larger blades 22, and that the larger blades of one frame are between a pair of smaller blades 22 in the other frame. Other patterns are also possible, although tests have revealed that the described pattern is preferable.

Figure 10:
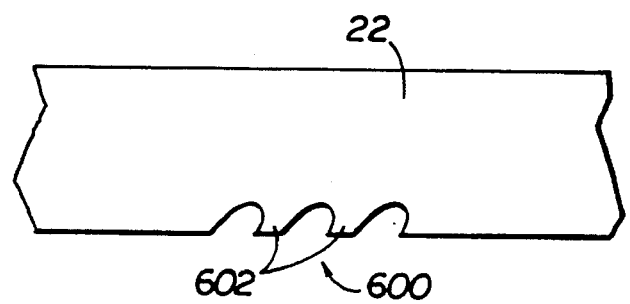
FIG. 10 is a side view of a blade having a sawtooth detail in accordance with the present invention.

FIG. 9(B) shows the blades after a 90 degree rotation through the reciprocating action. After another 90 degree rotation, an end view of the blades would again appear as in FIG. 9(A). After yet another 90 degree rotation, the blades will appear, in end view, as shown in FIG. 9(C). The resulting vertical and horizontal motions of blades, together with their alternating sizes and relative placement, enhances the tilting of wood chips placed on the screen formed by the blades, which thereby enhances the sorting process FIG. 10 shows an optional detail of the bottom portion of an end of a typical one of the blades 22. There is a tenancy for a ribbon-like material or fines from the wood chips to build up, especially near the discharge end 155 of the blade screen 166. These blades 22 preferably have a sawtooth-like bottom 600 including a plurality of teeth 602 located in the bottom edge of the blade 22 to function as a cutting means to avoid the buildup of ribbon-like material from wood chips. It is not necessary that the teeth 602 be formed along the entire length of blade bottom 600. However, for those blades 22 that are tensioned in the inner frame 103 and 110, it has been found to be particularly effective to have at least a sawtooth portion at the bottom of the blades 22 near the region where those blades 22 extend over the outer frame 102 near the discharge end 155 of the screen 166. It has also been found to be particularly effective, for those blades 22 that are tensioned in the outer blade assembly, frames 100 and 102, to have at least a sawtooth portion at the bottom 600 of the blades 22 near the region where the blades 22 extend over the inner frame 103 near the discharge end 155 of the screen 166.

What is claimed is:

1. An elastomeric joint between a frame member having disposed vertical faces and an interconnecting bottom and a bearing housing having a top and an opposed bottom attached to an eccentric shaft, comprising:

a pair of wing members, each fixedly attached to an opposite vertical face of the frame member;

a pair of segments depending from respective ones of the wing members, the segments having opposed faces, each of the faces having an opposed notch so that the notches are directed towards each other;

a bearing support having a top, an opposed bottom affixed to the top of the eccentric shaft, two opposed ends, and two opposed sides wherein the two sides each have an indentation therein which is directed towards, and is in registry with, the notches of the segments; and a pair of elastomeric strips, each configured to be received within the space formed between the notch in the segment and a respective indentation on the bearing support and wherein the elastomeric strips absorb any relative motion between the frame member and the bearing housing.

2. The elastomeric joint of claim 1, further comprising an end plate fixedly attached to each of the two opposed ends of the bearing support wherein the end plate prevents longitudinal movement of the elastomeric strip.

3. The elastomeric joint of claim 1, wherein the elastomeric strips comprise a rubber inner core having a hardness of ASTM D 2000 M5 AA714 75±5 Shore A and a rubber outer section having a hardness of ASTM D 2000 M4 AA617 60±5 Shore A.

4. The elastomeric joint of claim 1, further comprising a pair of clamp plates, each being attached to one of the segments wherein the clamp plates compress the elastomeric strip to facilitate mounting of the elastomeric joint and to achieve the desired loading of the elastomeric strip.

* * * * *